(12) United States Patent
Ferris

(10) Patent No.: US 7,584,929 B2
(45) Date of Patent: Sep. 8, 2009

(54) COUPLER FOR CABLE TROUGH

(75) Inventor: Matthew D. Ferris, Carver, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 268 days.

(21) Appl. No.: 11/677,174

(22) Filed: Feb. 21, 2007

(65) Prior Publication Data

US 2008/0199250 A1 Aug. 21, 2008

(51) Int. Cl.
*E04D 13/064* (2006.01)
(52) U.S. Cl. .................. 248/48.1; 405/121; 403/109.3; 403/325
(58) Field of Classification Search .............. 403/109.3, 403/325, 122, 387; 29/429, 428; 52/11; 248/48.1; 405/121–123
See application file for complete search history.

(56) References Cited

U.S. PATENT DOCUMENTS

| | | | |
|---|---|---|---|
| 2,316,166 A | 4/1943 | Huguelet | |
| 2,360,159 A | 10/1944 | Peck | |
| 2,741,499 A | 4/1956 | Kussmaul | |
| 2,821,154 A | 1/1958 | Tennison, Jr. | |
| 2,823,056 A | 2/1958 | DiMeo et al. | |
| 2,834,622 A | 5/1958 | Reeves | |
| 2,880,887 A | 4/1959 | McClurg | |
| 2,891,750 A | 6/1959 | Bergquist | |
| 3,022,972 A | 2/1962 | Bunston | |
| 3,042,351 A | 7/1962 | Du Bois | |
| 3,188,030 A | 6/1965 | Fischer | |
| 3,351,699 A | 11/1967 | Merckle | |
| 3,370,121 A | 2/1968 | Merckle | |
| 3,457,598 A | 7/1969 | Mariani | |
| 3,471,629 A | 10/1969 | O'Leary | |
| 3,493,917 A | 2/1970 | Glowacz | |
| 3,603,625 A | 9/1971 | Cottrell et al. | |

(Continued)

FOREIGN PATENT DOCUMENTS

DE 3636412 A1 4/1988

(Continued)

OTHER PUBLICATIONS

Exhibit A, Ditel, Inc.; Ditel UPL-1000/UPT-1000/Corner Cable Guides; product information, 2 pages, © 1986.

(Continued)

*Primary Examiner*—Amy J. Sterling
(74) *Attorney, Agent, or Firm*—Merchant & Gould P.C.

(57) ABSTRACT

Elements, couplers, systems, and methods for joining two or more trough members. A locking element for a coupler of a cable trough system includes a member including a first member end configured to be coupled to the coupler, and a second member end. The locking element also includes a locking member including a first portion slidingly coupled to the second member end of the member, and a second portion extending to a point, and a handle member defining a bottom surface and being pivotally coupled to the second member end of the member, the handle member pivoting between locked and unlocked positions. As the handle member is pivoted from the unlocked to the locked position, the bottom surface moves the locking member along the member so that the point of the locking member extends into a spacing formed by the coupler.

1 Claim, 3 Drawing Sheets

U.S. PATENT DOCUMENTS

| | | | |
|---|---|---|---|
| 3,782,420 A | | 1/1974 | Kolb et al. |
| 3,875,618 A | * | 4/1975 | Schuplin .................. 24/16 PB |
| 3,915,420 A | | 10/1975 | Norris |
| 4,099,749 A | | 7/1978 | van Vliet |
| 4,305,236 A | | 12/1981 | Williams |
| 4,854,665 A | | 8/1989 | Gagnon |
| 4,954,015 A | * | 9/1990 | McGowan .................. 405/121 |
| 5,035,092 A | | 7/1991 | Brant |
| 5,038,528 A | * | 8/1991 | Brant ........................... 52/11 |
| 5,067,678 A | | 11/1991 | Henneberger et al. |
| 5,078,530 A | | 1/1992 | Kim |
| 5,100,221 A | | 3/1992 | Carney et al. |
| 5,134,250 A | | 7/1992 | Caveney et al. |
| 5,142,606 A | | 8/1992 | Carney et al. |
| 5,161,580 A | | 11/1992 | Klug |
| 5,316,243 A | | 5/1994 | Henneberger |
| D348,651 S | | 7/1994 | Henneberger |
| 5,469,893 A | | 11/1995 | Caveney et al. |
| 5,547,307 A | | 8/1996 | Decore et al. |
| 5,617,678 A | | 4/1997 | Morandin et al. |
| 5,720,567 A | | 2/1998 | Rinderer |
| 5,752,781 A | | 5/1998 | Haataja et al. |
| 5,753,855 A | | 5/1998 | Nicoli et al. |
| 5,792,993 A | | 8/1998 | Rinderer |
| D402,262 S | | 12/1998 | Scherer et al. |
| D402,263 S | | 12/1998 | Scherer et al. |
| D413,306 S | | 8/1999 | Scherer et al. |
| 5,995,699 A | | 11/1999 | Vargas et al. |
| 5,998,732 A | | 12/1999 | Caveney et al. |
| D419,962 S | | 2/2000 | Caveney |
| 6,037,543 A | | 3/2000 | Nicoli et al. |
| D430,543 S | | 9/2000 | Rohder |
| 6,126,122 A | | 10/2000 | Ismert |
| 6,143,984 A | | 11/2000 | Auteri |
| 6,188,024 B1 | | 2/2001 | Benito-Navazo |
| 6,193,434 B1 | | 2/2001 | Durin et al. |
| D447,737 S | | 9/2001 | Scherer et al. |
| 6,402,418 B1 | | 6/2002 | Durin et al. |
| 6,424,779 B1 | * | 7/2002 | Ellison et al. ............... 385/134 |
| 6,450,458 B1 | * | 9/2002 | Bernard .................... 248/68.1 |
| 6,454,485 B2 | | 9/2002 | Holcomb et al. |
| 6,463,631 B2 | | 10/2002 | Noda |
| 6,476,327 B1 | | 11/2002 | Bernard et al. |
| 6,512,875 B1 | | 1/2003 | Johnson et al. |
| 6,520,192 B1 | | 2/2003 | Lo |
| 6,523,791 B2 | * | 2/2003 | Bernard et al. ............. 248/68.1 |
| 6,603,073 B2 | | 8/2003 | Ferris |
| 6,634,605 B2 | * | 10/2003 | Bernard et al. ............. 248/68.1 |
| 6,634,825 B2 | | 10/2003 | Tolkoff et al. |
| 6,709,186 B2 | * | 3/2004 | Ferris et al. .................. 403/293 |
| 6,715,719 B2 | | 4/2004 | Ferris et al. |
| 6,810,191 B2 | | 10/2004 | Ferris et al. |
| 7,029,195 B2 | | 4/2006 | Ferris et al. |
| 7,093,997 B2 | | 8/2006 | Ferris et al. |
| 7,175,137 B2 | | 2/2007 | Ferris et al. |
| 2002/0006312 A1 | | 1/2002 | Buard |
| 2002/0096606 A1 | | 7/2002 | Bernard et al. |
| 2003/0147690 A1 | | 8/2003 | Ronnquist |
| 2003/0177628 A1 | * | 9/2003 | Viklund ....................... 29/428 |
| 2003/0183731 A1 | | 10/2003 | Ferris et al. |
| 2003/0183732 A1 | | 10/2003 | Nault et al. |
| 2004/0159750 A1 | | 8/2004 | Ferris et al. |
| 2006/0210356 A1 | | 9/2006 | Ferris et al. |
| 2006/0261240 A1 | | 11/2006 | Ferris et al. |

FOREIGN PATENT DOCUMENTS

| | | |
|---|---|---|
| DE | 102 12 285 A1 | 11/2002 |
| EP | 0 315 023 A2 | 5/1989 |
| EP | 0 571 307 A1 | 11/1993 |
| EP | 0 486 442 B1 | 10/1995 |
| EP | 0 874 260 A1 | 10/1998 |
| EP | 1 033 800 A1 | 9/2000 |
| EP | 1 160 949 A2 | 12/2001 |
| EP | 1 160 950 A2 | 12/2001 |
| EP | 1 249 912 A1 | 10/2002 |
| FR | 1479341 | 5/1967 |
| GB | 549840 | 12/1942 |
| GB | 1 342 085 | 12/1973 |
| WO | 99/06746 | 2/1999 |
| WO | 00/75550 | 12/2000 |
| WO | 02/18991 | 3/2002 |
| WO | 02/31939 | 4/2002 |
| WO | 02/33445 | 4/2002 |
| WO | 02/086576 A1 | 10/2002 |
| WO | 2004/006400 A1 | 1/2004 |

OTHER PUBLICATIONS

Exhibit B, ADC Telecommunications, Inc.; FiberGuide™, Fiber Management System, 6 pages front and back printed, 16/1989.

Exhibit C, Warren & Brown Technologies Pty. Ltd., Fibre Optic Management Systems, Component Selection Guide, 19 pages of product information. Source: www.warrenandbrown.com.au (admitted prior art as of the filing date).

Exhibit D, Panduit Network Connectivity Group, FiberRunner™ 6×4 Routing System Product Brochure, 2 pages, © Panduit Corp. 2000.

Exhibit E, Panduit Corp. FiberRunner™ 4×4 Quiklock™ Coupler (FRBC4X4) Customer Drawing, 1 page, Jul. 13, 2001.

Exhibit F, Panduit Corp. FiberRunner™ 6×4 Quiklock™ Coupler (FRBC6X4) Customer Drawing, 1 page, May 10, 2000.

Exhibit G, Panduit Corp. FiberRunner™ 12×4 Quiklock™ Coupler (FRBC12X4) Customer Drawing, 1 page, Jan. 3, 2001.

Exhibits H-Y, Photographs of various Panduit products (admitted prior art as of the filing date).

U.S. Appl. No. 11/425,605, filed Jun. 21, 2006.
U.S. Appl. No. 11/677,181, filed Feb. 21, 2007.
U.S. Appl. No. 11/677,184, filed Feb. 21, 2007.
U.S. Appl. No. 11/677,188, filed Feb. 21, 2007.
U.S. Appl. No. 11/677,193, filed Feb. 21, 2007.
U.S. Appl. No. 11/677,200, filed Feb. 21, 2007.
U.S. Appl. No. 11/677,203, filed Feb. 21, 2007.

* cited by examiner

COUPLER FOR CABLE TROUGH

RELATED APPLICATIONS

This application is related to the following applications: U.S. patent application Ser. No. 11/677,181; U.S. patent application Ser. No. 11/677,184; U.S. patent application Ser. No. 11/677,188; U.S. patent application Ser. No. 11/677,193; U.S. patent application Ser. No. 11/677,200; and U.S. patent application Ser. No. 11/677,203; all of which were filed on even date herewith and are incorporated by reference herein.

TECHNICAL FIELD

Embodiments disclosed herein relate to systems for the management and routing of telecommunication cables, and, more particularly, to couplers for joining trough members.

BACKGROUND

In the telecommunications industry, optical fiber systems are increasingly used for high-speed signal transmission. With the increased utilization of optical fiber systems, optical fiber cable management requires industry attention.

One area of optical fiber management is the routing of optical fibers from one piece of equipment to another. For example, in a telecommunications facility, optical fiber cables are routed between fiber distribution equipment and optical line terminating equipment. In buildings and other structures that carry such equipment, the cable routing typically takes place in concealed ceiling areas or in other manners to route cables from one location to another.

When routing optical fibers and other cables such as copper wires, it is desirable that a routing system is readily modifiable and adaptable to changes in equipment needs. Accordingly, such routing systems include a plurality of components, such as trough members and couplers, for defining the cable routing paths. The trough members are joined together by couplings. U.S. Pat. Nos. 5,067,678; 5,316,243; 5,752,781; 6,709,186; and 6,715,719 teach cable routing systems that include a plurality of trough members and couplers.

Various concerns arise with the use of couplers for coupling trough members. One concern is that a plurality of hardware is used for joining the trough members. This hardware can be cumbersome. Further, there is sometimes a need to rearrange or change the trough members and couplers. It is desirable to provide couplers that can be disconnected and reconnected.

SUMMARY

Embodiments disclosed herein relate to a system for the management and routing of telecommunication cables, and, more particularly, to elements, couplers, systems, and methods for joining two or more trough members.

One aspect relates to a locking element for a coupler of a cable trough system includes a member including a first member end configured to be coupled to the coupler, and a second member end. The locking element also includes a locking member including a first portion slidingly coupled to the second member end of the member, and a second portion extending to a point, and a handle member defining a bottom surface and being pivotally coupled to the second member end of the member, the handle member pivoting between locked and unlocked positions. As the handle member is pivoted from the unlocked to the locked position, the bottom surface moves the locking member along the member so that the point of the locking member extends into a spacing defined by the coupler

DETAILED DESCRIPTION

As used herein, the terms "couple" and "coupled" mean to join or attach a first element in relation to a second element, whether the attachment is made directly with the second element or indirectly through one or more intermediate components. As used herein, the term "slot" means a space defined by one or more surfaces and can include, without limitation, T-slots, closed slots, flanges, and projections.

Figure 1:
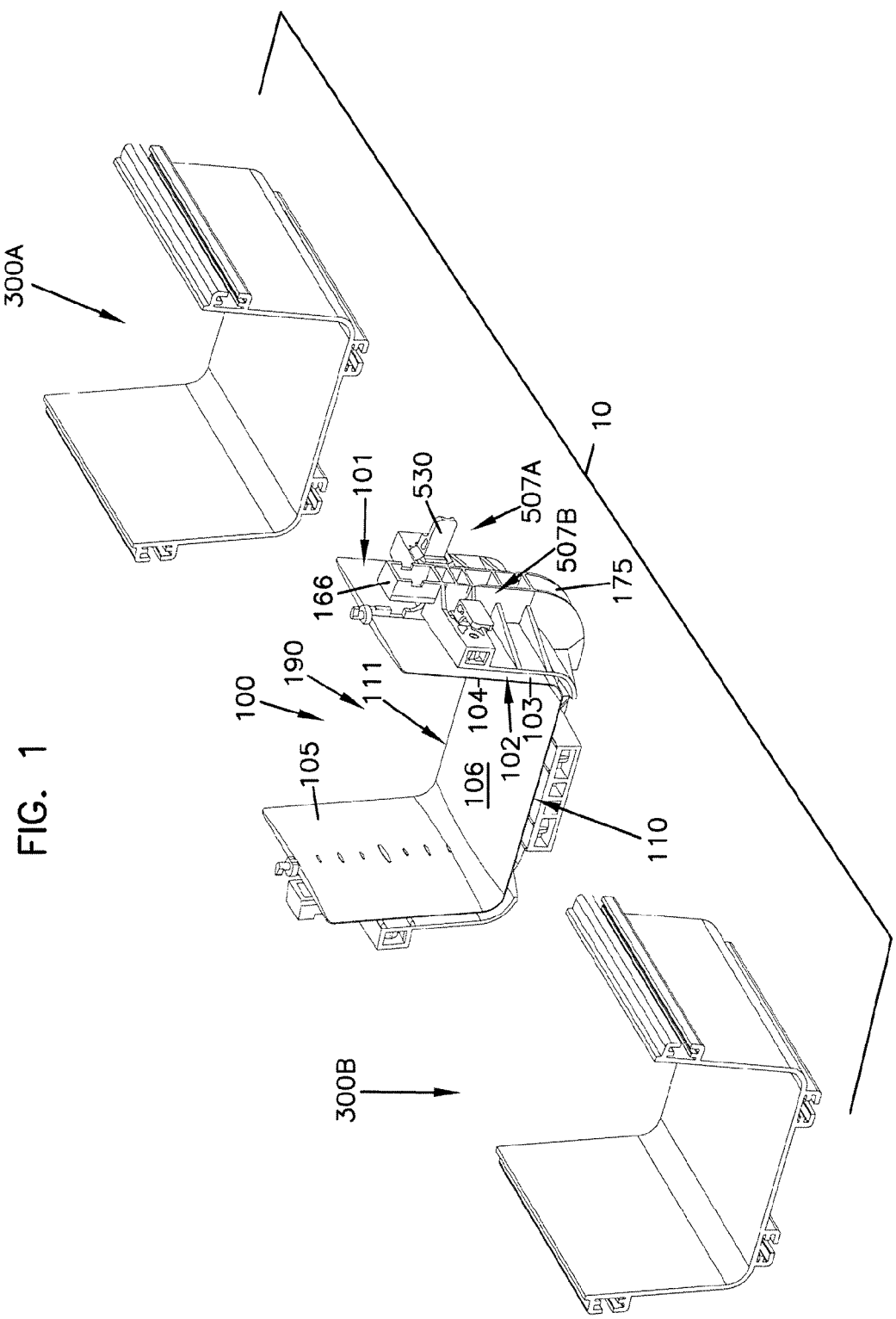
FIG. 1 is a perspective view of an embodiment of a trough system shown in exploded form.

FIG. 1 shows an example trough system 10 including a coupler 100 for interconnecting trough members 300A, 300B. Coupler 100 includes locking elements 507A, 507B. Additional locking elements can be provided on the opposite and bottom sides of coupler 100. Locking elements 507A, 507B are used to secure the connection between coupler 100 and trough members 300A, 300B.

In addition, coupler 100 can be configured to release the connections between coupler 100 and trough members 300A, 300B. In an example embodiment, locking elements 507A, 507B are tool-less (i.e., do not require the use of a separate tool to couple and uncouple trough members 300A, 300B to coupler 100). However, elements requiring one or more auxiliary tools are also within the scope of the present disclosure.

I. Coupler

As shown in FIG. 1, coupler 100 includes a first guiding surface 101 and a second guiding surface 102 at least partially surrounding first guiding surface 101, as well as a first coupler end 110 and a second coupler end 111. A spacing 103 is defined between first guiding surface 101 and second guiding surface 102. Spacing 103 is sized to receive a trough member (e.g., trough members 300A, 300B) or another trough system component inserted into the spacing 103 in a longitudinal direction 190.

First guiding surface 101 of coupler 100 is generally in the shape of a trough, including a first side wall portion 104 and a second side wall portion 105, as well as a bottom wall portion 106 joining first and second side wall portions 104 and 105. As used herein, the term "trough" means any structure that defines an interior in which an element such as an optical cable can be maintained. Second guiding surface 102 is also in the shape of a trough. A midpoint or midsection 175 divides coupler 100 into first and second halves, and generally surrounds at least a portion of first guiding surface 101. A rib portion 166 is coupled to second guiding surface 102. Locking elements 507A, 507B are coupled to second guiding surface 102, as described below.

Figure 2:
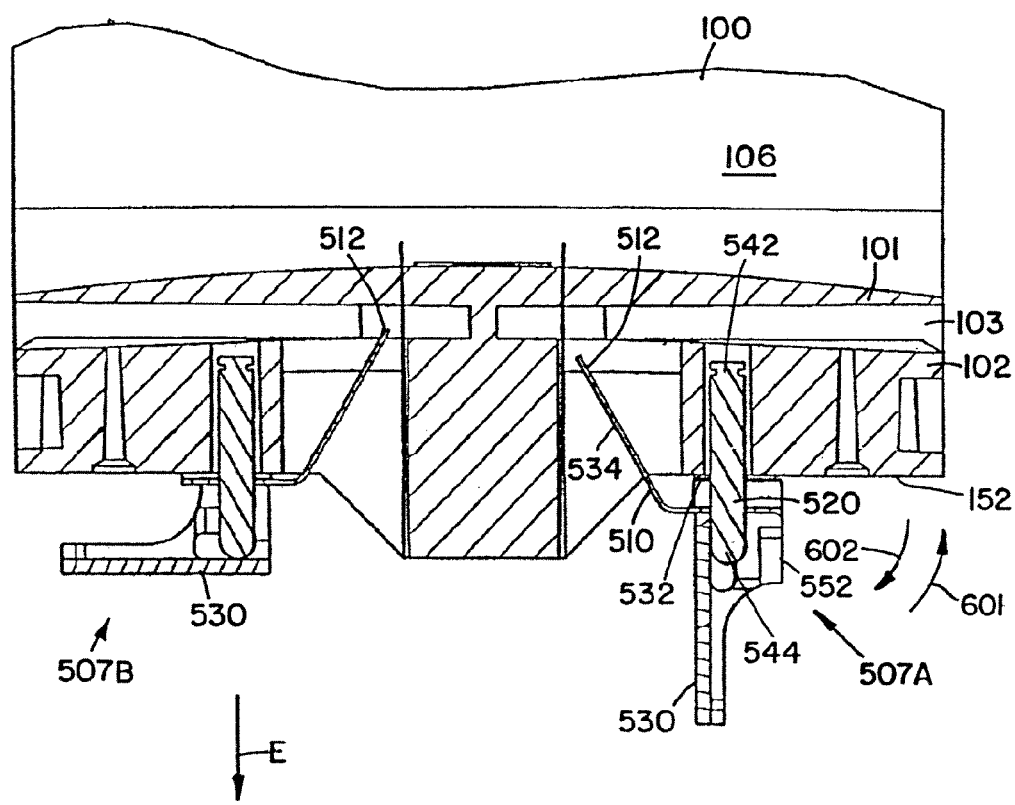
FIG. 2 is a cross-sectional view of the portion of the coupler of FIG. 1.

Referring now to FIG. 2, example locking elements 507A, 507B are shown. In the example shown, locking element 507A is in the unlocked position, and locking element 507B is in the locked position. Locking elements 507A, 507B each include a locking portion 510, a member 520, and a handle member 530.

In the example shown, locking portion 510 includes a first portion 532 coupled to member 520, so that locking portion 510 can slide along member 520. Locking portion 510 also includes a second portion 534 that extends towards spacing 103 of coupler 100. A free end of second portion 534 forms a point 512 that can extend into spacing 103 and engage trough members 300A, 300B, as described further below.

Member 520 is connected at a first end 542 to coupler 100. Member 520 is connected at a second end 544 to handle member 530.

Handle member 530 is pivotally connected to second end 544 of member 520. Handle member 530 pivots in directions 601, 602 between locked and unlocked positions, as described below. As handle member 530 pivots to the locked position in direction 601, a bottom portion 552 contacts and pivots about an outer surface 152 of coupler 100. In addition, bottom portion 552 of handle member 530 contacts and moves first portion 532 of locking portion 510 along member 520 towards spacing 103 so that point 512 enters spacing 103. Likewise, when handle member 530 pivots to the unlocked position in direction 602, bottom portion 552 releases first portion 532 of locking portion 510 so that locking portion 510 moves along member 520 so that point 512 moves out of spacing 103.

As described above, handle member 530 can be moved from locked (locking element 507B) to unlocked (locking element 507A) positions. In the locked position, locking portion 510 includes end 512 that extends into spacing 103 of coupler 100 to engage a trough member that is inserted therein. When handle member 530 is moved into the unlocked position, locking portion 510 moves in a direction E to the unlocked position so that point 512 of member 510 is removed from spacing 103 to disengage a trough member positioned therein.

II. Trough

Figure 3:
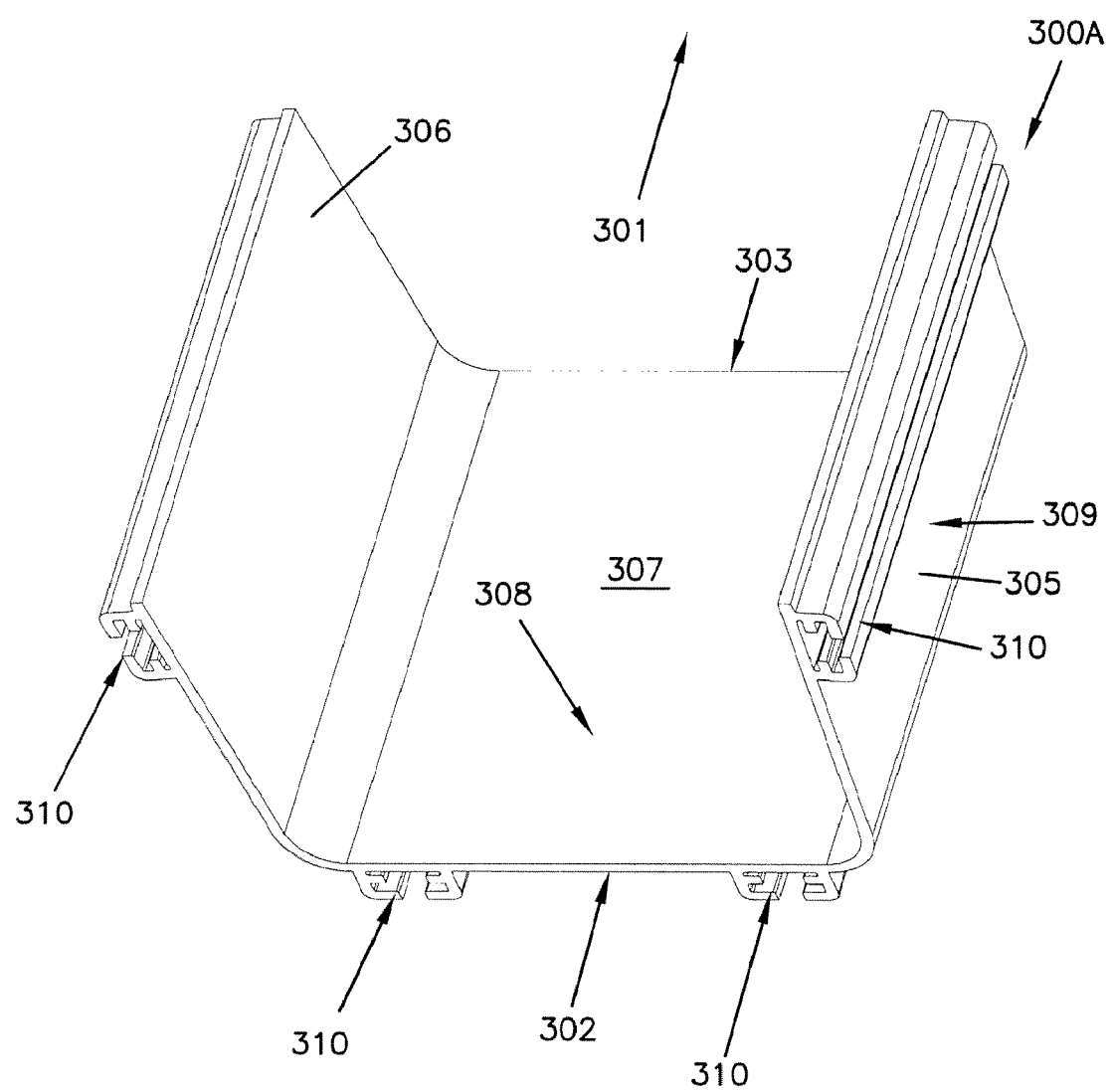
FIG. 3 is a perspective view of a trough member of the trough system of FIG. 1.

Referring now to FIG. 3, trough member 300A is shown in more detail. As used herein, the phrase "trough member" is used to refer to any trough, fitting, railway, raceway, or similarly configured component including any number of ends. Although a specific embodiment of a trough member is shown in and described herein, other trough members can also be used.

Trough member 300A includes a first terminal end 302 and a second terminal end 303. Trough member 300A is generally in the shape of a trough including first and second side walls 305, 306 coupled by a bottom wall 307, thereby defining an interior surface 308 and an exterior surface 309. Walls 305, 306, 307 are each generally planar. In example embodiments, exterior surface 309 of trough member 300A defines one or more slots 310 on the side walls 305 and 306 and bottom wall 307.

III. System

Referring again to FIGS. 1-3, terminal ends 302, 303 of the trough members 300A, 300B are slidingly engaged in direction 190 within the spacing 103 between the first and second guiding surfaces 101 and 102 of coupler 100. The thickness of the walls of each of trough members 300A, 300B, or the distance between interior and exterior surfaces 308, 309, are sized to fit within spacing 103 of coupler 100. Coupler 100 overlaps terminal ends 302, 303 of each of trough members 300A, 300B to form the coupling, the overlap defining an overlap region.

Handle member 530 is pivoted to the locked position in direction 601, so that bottom portion 552 of handle member 530 contacts and moves first portion 532 of locking portion 510 along member 520 towards spacing 103 so that point 512 digs into exterior surface 309 of trough member 300A to resist movement of trough member 300A in a direction opposite of direction 190 out of coupler 100.

In example embodiments, handle member 530 can be moved into the locked position prior to trough member 300A being inserted into spacing 103. When trough member 300A is thereafter inserted, exterior surface 309 of trough member 300A rides along point 512 of locking portion 510 until trough member 300A is fully inserted into coupler 100 to connect coupler 100 to trough member 300A. In alternative embodiments, trough member 300A can be inserted into spacing 103, and thereafter handle member 530 can be moved from the unlocked to the locked position to connect coupler 100 to trough member 300A.

To release trough member 300A, handle member 530 is moved in direction 602 to the unlocked position. This causes point 512 of locking portion 510 to move out of spacing 103. As point 512 moves out of spacing 103, point 512 disengages exterior surface 309 of trough member 300A, and trough member 300A can be removed from coupler 100 in the direction opposite to that of direction 190.

In example embodiments, the locking elements disclosed herein are tool-less in that the locking elements do not require a separate tool to move the locking elements from the locked position to the unlocked position and vice versa. For example, in some embodiments, the locking elements can be moved from the locked position to the unlocked position through use of the user's hand.

In example embodiments, the locking elements disclosed herein are auto-locking, in that the locking elements can be placed in the locked position prior to insertion of the trough member into the coupler. When the trough member is introduced into the coupler, the locking elements automatically lock the trough member to the coupler. The locking elements can subsequently be moved to the unlocked position to release the trough member from the coupler.

In other alternative embodiments, a coupler can be configured to be coupled to more than two trough members, therefore including more than the first and second coupler ends. Further, a greater number of locking elements can be presented for each coupler end, or, alternatively, fewer locking elements such as, for example, two on opposing sides, can be used. Other configurations are possible.

The above specification, examples and data provide a complete description of the manufacture and of the invention. Since many embodiments of the invention can be made without departing from the spirit and scope of the disclosure, the invention resides in the claims hereinafter appended.

What is claimed is:

1. A cable trough system, comprising:
a first trough member including a terminal end and an exterior surface;
a coupler including a body having a body terminal end defining an overlap region, the overlap region being sized to slideably receive the terminal end of the trough member along a longitudinal direction of the body; and
a locking element coupled to the body of the coupler, the locking element including:
a member including a first member end configured to be coupled to the coupler, and a second member end;
a locking member including a first portion slidingly coupled to the second member end of the member, and a second portion extending to a point; and
a handle member defining a bottom surface and being pivotally coupled to the second member end of the member, the handle member pivoting between locked and unlocked positions;

wherein, as the handle member is pivoted from the unlocked to the locked position, the bottom surface moves the locking member along the member so that the point of the locking member extends into a spacing defined by the coupler to engage the exterior surface of the trough member.

* * * * *